(12) United States Patent
Michalek et al.

(10) Patent No.: US 7,233,138 B2
(45) Date of Patent: Jun. 19, 2007

(54) PRESS-IN EXCITER RING ASSEMBLY

(75) Inventors: John S Michalek, Troy, MI (US); Matthew P Brown, Saginaw, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 191 days.

(21) Appl. No.: 10/946,531

(22) Filed: Sep. 21, 2004

(65) Prior Publication Data

US 2005/0035756 A1 Feb. 17, 2005

Related U.S. Application Data

(63) Continuation of application No. 10/085,743, filed on Feb. 26, 2002.

(51) Int. Cl.
*G01P 3/48* (2006.01)
*G01B 7/30* (2006.01)

(52) U.S. Cl. .................. 324/173; 324/207.22; 384/448

(58) Field of Classification Search ........ 324/173–174, 324/207.22; 384/448
See application file for complete search history.

(56) References Cited

U.S. PATENT DOCUMENTS 6,549,001 B1 * 4/2003 Dobbs et al. ............... 324/173

\* cited by examiner

*Primary Examiner*—Reena Aurora
(74) *Attorney, Agent, or Firm*—Harness, Dickey & Pierce, P.L.C.

(57) ABSTRACT

An exciter ring assembly to detect rotational parameters of an axle within a tube has an exciter ring attached to the axle by an elastomer insert. The insert provides a frictional interference fit with the axle. The insert affixes the exciter ring to rotate with the axle. The elastomer insert is supplied with radially-spaced axial channels to enable oil flow past the assembly. The outer member of the assembly is press fit into the axle tube. The outer member remains stationary with respect to the axle tube. The outer member restricts the axial movement of the exciter ring and enables rotation of the exciter ring and provides oil flow across the exciter ring assembly.

15 Claims, 4 Drawing Sheets

PRESS-IN EXCITER RING ASSEMBLY

CROSS REFERENCE TO RELATED APPLICATION

This is a continuation of an application filed Feb. 26, 2002 and assigned U.S. Ser. No. 10/085,743.

FIELD OF THE INVENTION

The present invention relates generally to speed sensing devices and specifically to a device to measure the speed of a motor vehicle axle.

BACKGROUND OF THE INVENTION

The advent of anti-lock braking systems and traction control systems have created a need for accurate speed measurement of individual wheels of a vehicle. Accordingly, there has been an increase in motor vehicles equipped with speed sensing devices to measure axle rotation which, in turn, enables measurement of wheel speed.

Typically, a ferrous or magnetic exciter ring is installed to rotate with an axle. A sensor, fixed with respect to axle rotation, is placed in the vicinity of the teeth of the exciter ring. When an exciter ring is rotated near a variable reluctance sensor, the teeth on the exciter ring pass through the magnetic lines of flux generated by the magnet in the sensor. As the teeth are passing through the magnetic lines of flux, a voltage is generated in the coil within the sensor. The magnitude of the voltage is related to the speed and size of the exciter ring teeth in addition to design parameters inside the sensor, and inversely related to the distance between the sensor and the exciter ring teeth. The exciter ring assembly will also work similarly with an active (Hall Effect) sensor. The sensor is coupled to a control system which calculates the angular speed of the axle. The best sensor design selection is dependent upon the needs of the controller system. Calculation is carried out with inputs of the number of teeth sensed per unit of time and the known number of teeth of the exciter ring. During acceleration or deceleration, the instantaneous speed of the axle is not directly measurable by these speed sensing devices due to the finite number of teeth on the exciter ring. Thus, the accuracy of these devices is limited by the number of teeth of the exciter ring. A larger diameter exciter ring that provides more teeth can be used to obtain a more accurate speed measurement.

A variety of speed sensing devices have been used in the art. An example of a known speed sensing device is shown in U.S. Pat. No. 5,067,350 to Grillo et al. which discloses an annular exciter ring. Another example is disclosed in U.S. Pat. No. 5,967,669 to Ouchi. Here, a roller bearing unit includes an integral exciter ring.

It is known within the art to mount an exciter ring or target in the differential area of a driven axle. This location can usually accommodate a larger wheel since the differential housing within an axle assembly is typically of a larger diameter than the axle tube. One limitation to a speed sensing device located near the differential is the inaccuracy of the speed measurement associated with the elastic twisting of an axle under a torque loading or torque windup. While an axle is twisting, the actual wheel speed is not measured.

Alternatively, it is known to provide a speed sensing device that is integral with the wheel bearing assembly of an axle. This location reduces the inaccuracy due to torque windup, and increase complexity and mass. Additionally, the bearing assembly will have a higher cost and a different seal assembly may be required. While the above speed sensing devices may perform adequately for their intended purposes, a need exists for an improved exciter ring assembly that is less complex, provides for easier installation, and results in a more accurate measurement of actual wheel speed.

SUMMARY OF THE INVENTION

In view of the above, the present invention is directed to an exciter ring assembly that can be interference or press fit into an axle tube. An exciter ring is provided with teeth and is affixed to an axle. A sensor is fixed to the axle tube and located close to the teeth of the exciter ring. As the axle rotates, the sensor detects the movement of the exciter ring teeth. The sensitivity of the assembly is inversely related to the distance between the sensor and the teeth (typically a few millimeters or less). The exciter ring rotates in relation to an outer member that encompasses an integral lip of the ring. The outer member supplies the outside diameter for a press fit with an inside diameter of the axle tube. The axle tube can be provided with a bore inboard of the wheel bearing bore to accommodate this press fit. The outer member is constructed of stamped metal or similar construction capable of withstanding the press fit. Flutes are provided in the circumference of the outer member to promote oil flow past the exciter ring assembly and lubricate the wheel bearing. A spacer is located within the outer member and adjacent to the lip of the exciter ring to provide the correct spacing for the final assembly. The spacer helps to prevent noise in the assembly Additionally, the spacer is provided with cut-outs that enable oil flow past the exciter ring assembly. The press fit installation of the exciter ring assembly simplifies assembly since no further alignment or positioning of the exciter ring is necessary to ensure that the sensor, when installed, is within the required proximity to the teeth of the exciter ring.

The exciter ring assembly is press fit into the axle tube between the bearings that support the axle. The exciter ring assembly can be installed into the axle tube during manufacture of the axle assembly prior to installation of the wheel bearing. This location of the exciter ring assembly, near the wheel bearing, will ease axle alignment with the exciter ring bore during axle installation. Also the location reduces speed sensing inaccuracies due to torque windup. The diameter of the exciter ring can be larger than typical wheel bearing speed sensing rings and thus provide for more accurate speed measurement.

A further benefit to locating the exciter ring near the wheel bearing is derived from the lower amount of axle deflection near the bearings than at a location further from the bearings. Lower axle deflection reduces the gap variation distance between the sensor and teeth which, in turn, provides improved sensitivity. Lower axle deflection also reduces the maximum distance between the sensor and teeth which also provides improved sensitivity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
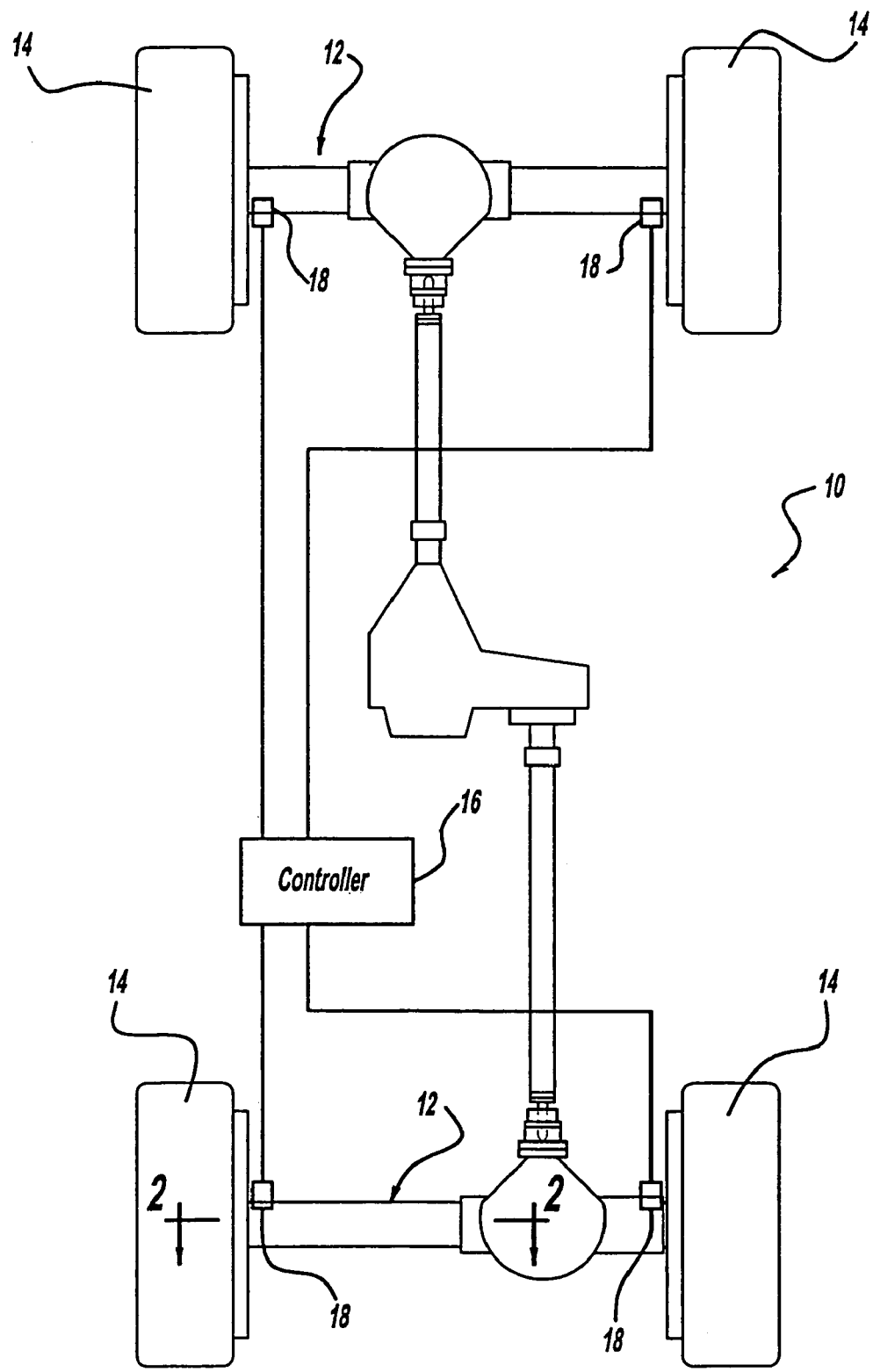
FIG. 1 is a schematic representation of an exemplary vehicle having the present invention incorporated therein.
Figure 2:
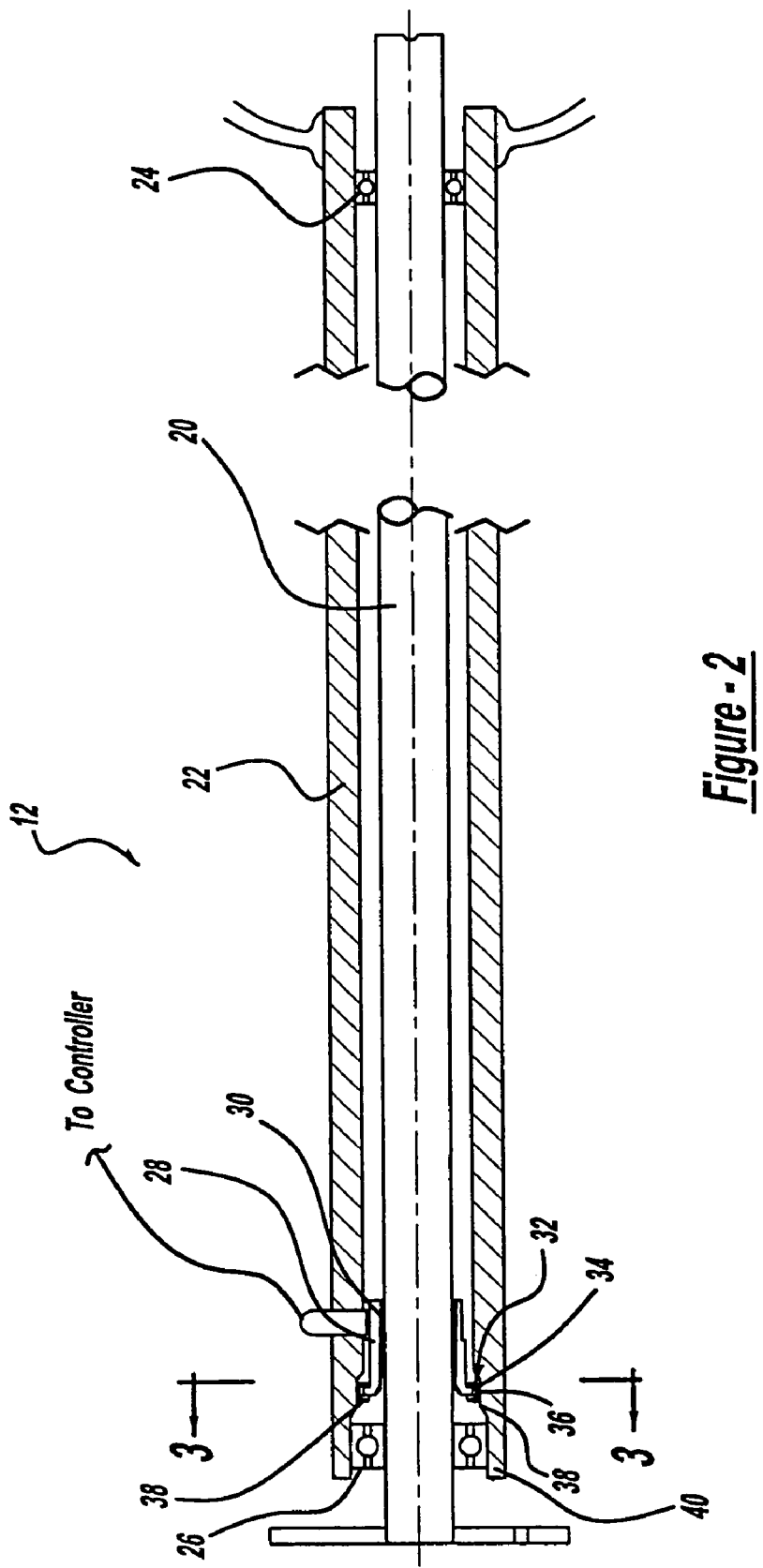
FIG. 2 is a sectional view of the axle assembly taken along line 2—2 of FIG. 1 incorporating the present invention.

In general, the present invention is directed to a speed sensing device which is operably installed within an axle tube. Referring to FIGS. 1 and 2, a four wheel drive vehicle 10 is schematically shown with axle assembly 12. Axle assembly 12 interconnects wheels 14. A controller 16 receives data from sensors 18. This data relates to the rotational parameters of axle 20. Sensors 18 are connected to axle assembly 12. Controller 16 is adapted to supply data to anti-lock braking systems, traction control systems, adaptive four-wheel drive systems or the like. Axle 20 is rotatably supported in axle tube 22 by differential bearing 24 and wheel bearing 26. Sensor 18 is mounted to axle tube 22 in close proximity to exciter ring 28. In the embodiment shown, exciter ring 28 is provided with an elastomer insert 30 that is sized for an interference fit with axle 20. Thus provided, exciter ring 28 is coupled to rotate with axle 20.

With continued reference to FIG. 2, exciter ring assembly 32 includes exciter ring 28 which is provided with lip 34. Exciter ring assembly 32 also includes outer member 36. The circumference of lip 34 fits within outer member 36 and is rotatable therewith. Outer member 36 is press fit into exciter ring axle bore 38 of axle tube 22. Wheel bearing 26 is fitted into wheel bearing bore 40 of axle tube 22.

Figure 3:
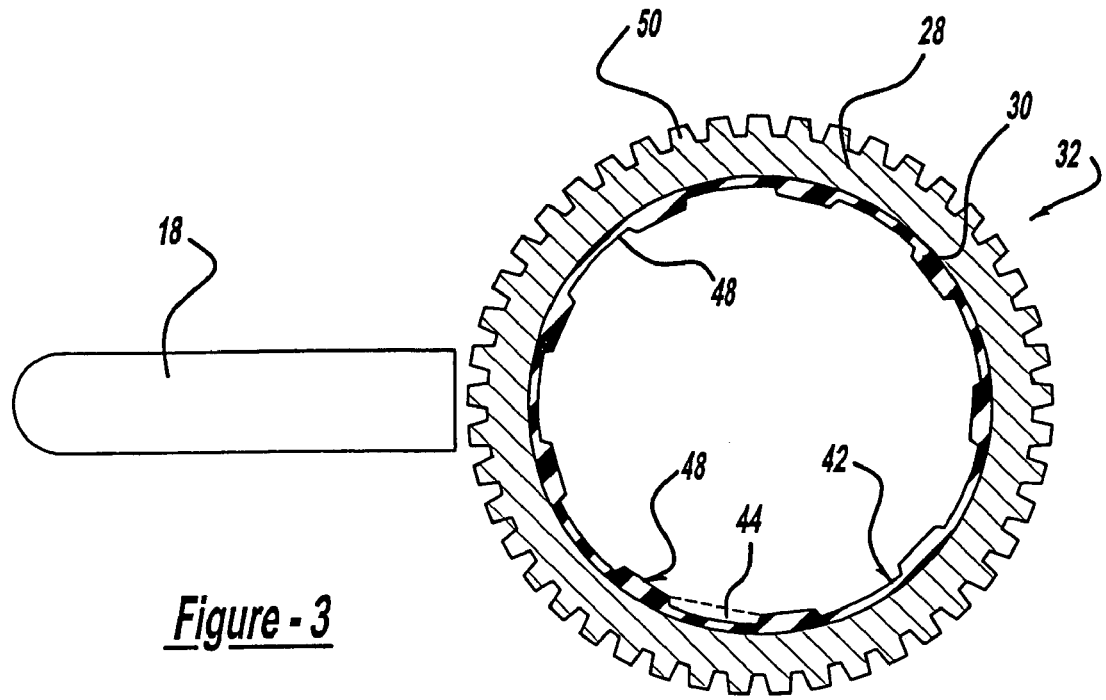
FIG. 3 is a sectional view of the exciter ring assembly taken along line 3—3 of FIG. 2 showing the ring teeth and elastomer insert flutes.

With reference to FIG. 3, exciter ring assembly 32 is shown in cross section perpendicular to the axis of axle 20. Exciter ring 28 has an inside surface 42 that is attached to elastomer insert 30. Preferably, the insert is of an elastomeric material. Elastomer insert 30 has channels 44 that are provided to enable oil flow between elastomer insert 30 and axle 20. An interior surface 46 of elastomer insert 30 is interference fit with axle 20 to ensure that exciter ring 28 rotates with axle 20. In the embodiment shown, oil channels 44 are formed in interior surface 46 of elastomer insert 30 to form interior surface 48 of elastomer insert 30.

With continued reference to FIG. 3, exciter ring 28 has teeth 50. Sensor 18, also shown in FIG. 2, detects the presence or absence of teeth 50 as exciter ring 28 rotates around the axis of axle 20. In the preferred embodiment, fifty-five teeth 50 are equally spaced around the circumference of exciter ring 28. As is known, sensor 18 can be operably connected to a controller 16 to calculate the rotational parameters of exciter ring 28. Rotational parameters include wheel speed and acceleration. These rotational parameters can be used as input to an anti-locking brake system, traction control system, torque modulating four-wheel drive system or other systems that require vehicle or wheel speed. An exemplary control system is described in U.S. Pat. No. 5,332,060, the specification and drawings therein are expressly incorporated by reference.

When the exciter ring 28 is rotated near the variable reluctance sensor 18, the teeth 50 on the exciter ring 28 pass through magnetic lines of flux generated by a magnet in the sensor 18. As the teeth 50 are passed through the magnetic lines of flux, a voltage is generated in a coil within the sensor 18. The magnitude of the voltage is related to the speed and size of the exciter ring teeth 50 in addition to design parameters within the sensor 18. A larger diameter exciter ring provides more teeth which in turn provides increased accuracy in the measurement of rotational parameters. In addition, a larger diameter exciter ring enables larger teeth and faster peripheral speed both of which improve sensitivity of the system and enable increased manufacturing tolerances and reduced cost. The magnitude of the voltage is inversely related to the distance between the sensor 18 and the exciter ring teeth 50. The lower the deflection of the shaft, the less gap variation and the less the maximum gap, both of which provide for improved sensitivity. The exciter ring assembly will also work similarly with an active (Hall Effect) sensor.

Figure 4:
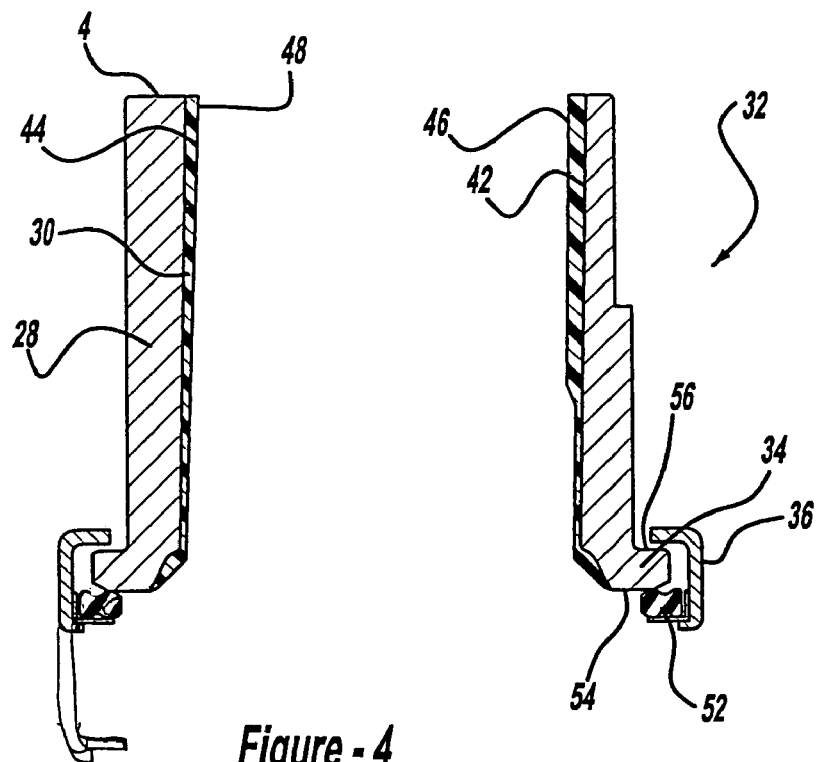
FIG. 4 is a sectional view of the exciter ring assembly along the axis of the axle showing the exciter ring lip.

With reference to FIG. 4, exciter ring assembly 32 is shown in cross section along the axis of axle 20. Exciter ring 28 is shown with lip 34 within outer member 36. Spacer 52 is shown adjacent to a first annular surface 54 of lip 34. Outer member 36 is shown to enclose lip 34 of exciter ring 28 and spacer 52. Outer member 36 enables rotation of exciter ring 28 about the axis of axle 20. Exciter ring 28 is limited in its axial movement with respect to sensor 18 during installation due to the interference between outer member 36 and first and second radially projecting annular surfaces 54, 56 of lip 34.

Figure 5:
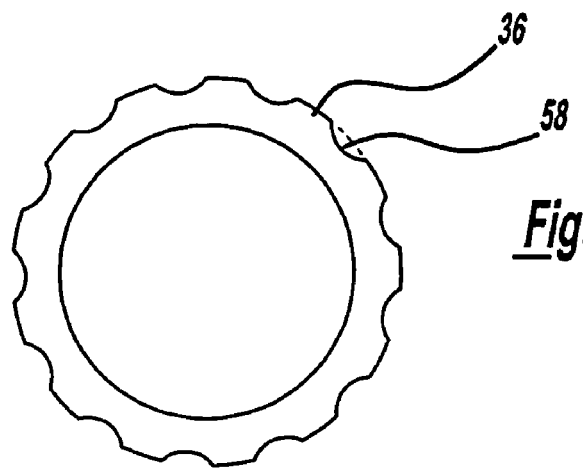
FIG. 5 is a sectional view of the outer member of the exciter ring assembly taken perpendicular to the axis of the assembly showing recesses for oil flow.
Figure 6:
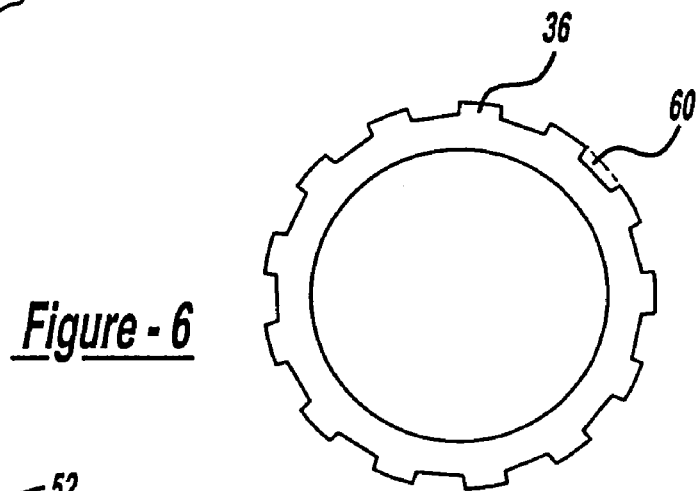
FIG. 6 is an alternate embodiment of the outer member of the exciter ring assembly showing cutouts for oil flow.

FIG. 5 shows the preferred embodiment of outer member 36 with circumferential recesses 58 formed along the axial length of outer member 34. The recesses 58 enable oil flow past the exciter ring assembly 30. FIG. 6 shows an alternate embodiment of outer member 36 with circumferential cutouts 60 to permit oil flow past the exciter ring assembly 32.

Figure 7:
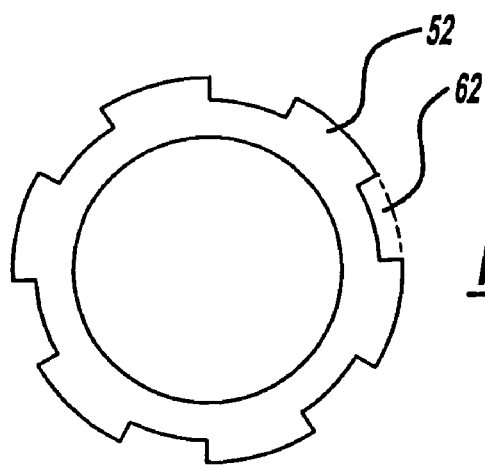
FIG. 7 a view of the spacer utilized within the exciter ring assembly taken perpendicular to the axis of the assembly.
Figure 8:
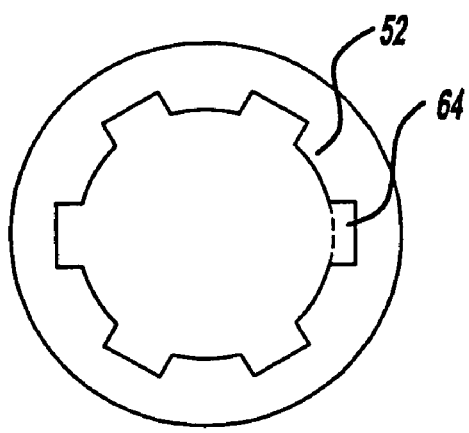
FIG. 8 an alternate embodiment of the spacer utilized within the exciter ring assembly.

FIG. 7 shows the preferred embodiment of spacer 52. Outside apertures 62 enable oil flow through the exciter ring assembly 30. FIG. 8 shows an alternate embodiment of spacer 52. Here, inside apertures 62 enable oil flow through exciter ring assembly 32. Alternatively, a coating may be added to the lip to act as a spacer. Here grooves may be present to enhance oil flow. Additionally, the coating, like the spacer, acts to reduce noise.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle comprising:
    an axle assembly;
    a plurality of sensors adapted to send signals to a controller, said controller adapted to determine the rotational parameters of an axle within said axle assembly; and
    an exciter ring assembly including an exciter ring coupled to rotate with said axle, said exciter ring having an annular lip protruding about the circumference of a first end of said ring, said ring having an aperture to accommodate the shaft of said axle, said ring having teeth extending axially along a second end of said ring, said sensor positioned to detect said teeth of said exciter ring, an outer member concentric to said lip, adapted to restrain the radially projecting annular surfaces of either annular end of said lip, said outer member fixed within said axle assembly; and a spacer located within said outer member, said spacer having a ring shaped body with an outer circumference and an inner circumference, said ring shaped body being continuous about a circle along the outer circumference and extending radially inward toward said inner circumference, and at least one cutout, for enabling oil flow, in said inner circumference, said cutout extending radially outward toward said outer circumference.

2. The vehicle of claim 1 wherein an elastomer insert is attached to the interior surface of said exciter ring and contacting said axle to restrain the relative rotation between said exciter ring and said axle.

3. The vehicle of claim 2 wherein said exciter ring includes a means for promoting oil flow within an axle tube in the region of said exciter ring assembly including channels within the interior surface of said elastomer insert to enable oil to pass from a first axial end of said exciter ring assembly to a second axial end of said exciter ring assembly.

4. The vehicle of claim 1 wherein said outer member includes recesses in the circumferential surface, said recesses enable oil flow past said exciter ring assembly.

5. The vehicle of claim 1 wherein said outer member includes cutouts in the circumferential surface, said cutouts enable oil flow past said exciter ring assembly.

6. An axle assembly comprising:

an axle tube;

an axle passing through a section of said axle tube;

an inner bore within said axle tube;

a sensing means for detecting rotational parameters of said axle; and an exciter ring assembly press fit into said inner bore comprising:

an exciter ring with an annular lip protruding about the circumference of a first end of said exciter ring, said exciter ring having a coaxial bore to accommodate the diameter of said axle, said exciter ring having axial teeth extending radially along a second end of said exciter ring, said sensing means positioned to detect said teeth of said exciter ring; and an outer member concentric to said lip, adapted to restrain the radially projecting annular surfaces of either annular end of said lip, said outer member adapted to an interference fit with said inner bore; and a spacer located within said outer member, said spacer having a ring shaped body with an outer circumference and an inner circumference, said ring shaped body being continuous about a circle along the outer circumference and extending radially inward toward said inner circumference, and at least one cutout, for enabling oil flow, in said inner circumference, said cutout extending radially outward toward said outer circumference.

7. The axle assembly of claim 6 wherein an elastomer insert is attached to the interior surface of said exciter ring and contacting said axle to restrain the relative rotation between said exciter ring and said axle.

8. The axle assembly of claim 7 wherein said exciter ring includes a means for enabling oil flow within said axle tube in the region of said exciter ring assembly including channels within said interior surface of said elastomer insert to enable oil to pass from a first axial end of said exciter ring assembly to a second axial end of said exciter ring assembly.

9. The axle assembly of claim 6 wherein said outer member includes recesses in the circumferential surface, said recesses enable oil flow past said exciter ring assembly.

10. The axle assembly of claim 6 wherein said outer member includes cutouts in the circumferential surface, said cutouts enable oil flow past said exciter ring assembly.

11. An exciter ring assembly comprising:

an exciter ring with an annular lip protruding about the circumference of a first end of said exciter ring, said exciter ring having a coaxial bore to accommodate the diameter of an axle, said exciter ring having radial teeth extending axially along a second end of said exciter ring, said lip having a first radially projecting annular end surface and a second radially projecting annular end surface; and an outer member concentric to said lip, said outer member restraining said first and second annular surfaces of said lip, said outer member adapted to be restrained relative to rotation of said axle; and a spacer located within said outer member, said spacer having a ring shaped body with an outer circumference and an inner circumference, said ring shaped body being continuous about a circle along the outer circumference and extending radially inward toward said inner circumference, and at least one cutout, for enabling oil flow, in said inner circumference, said cutout extending radially outward toward said outer circumference.

12. The exciter ring assembly of claim 11 wherein an elastomer insert is attached to the interior surface of said exciter ring and contacting said axle to restrain the relative rotation between said exciter ring and said axle.

13. The exciter ring assembly of claim 12 wherein said exciter ring includes a means for promoting oil flow within an axle tube in the region of said exciter ring assembly comprising channels within said interior surface of said elastomer insert to enable oil to pass from a first axial end of said exciter ring assembly to a second axial end of said exciter ring assembly.

14. The exciter ring assembly of claim 11 wherein said outer member includes recesses in the circumferential surface, said recesses enable oil flow past said exciter ring assembly.

15. The exciter ring assembly of claim 11 wherein said outer member includes cutouts in the circumferential surface, said cutouts enable oil flow past said exciter ring assembly.

* * * * *